United States Patent
Stoneman et al.

(10) Patent No.: US 6,813,302 B1
(45) Date of Patent: Nov. 2, 2004

(54) EYESAFE Q-SWITCHED ER-DOPED SOLID-STATE LASER

(75) Inventors: Robert C. Stoneman, Louisville, CO (US); Sammy W. Henderson, Boulder, CO (US)

(73) Assignee: Coherent Technologies, Inc., Boulder, CO (US)

( * ) Notice: Subject to any disclaimer, the term of this patent is extended or adjusted under 35 U.S.C. 154(b) by 0 days.

(21) Appl. No.: 09/921,495

(22) Filed: Aug. 3, 2001

(51) Int. Cl.[7] .......................... H01S 3/091; H01S 3/10
(52) U.S. Cl. .......................... 372/75; 372/21
(58) Field of Search .................. 372/6, 21, 75, 372/10, 3, 46, 27

(56) References Cited

U.S. PATENT DOCUMENTS

| | | | | |
|---|---|---|---|---|
| 4,901,330 A | * | 2/1990 | Wolfram et al. | 372/46 |
| 4,995,046 A | | 2/1991 | Fan et al. | |
| 5,402,434 A | * | 3/1995 | Manako et al. | 372/27 |
| 5,644,589 A | * | 7/1997 | Anthon | 372/19 |
| 5,710,786 A | * | 1/1998 | Mackechnie et al. | 372/6 |
| 5,841,801 A | * | 11/1998 | Suzuki | 372/20 |
| 5,963,575 A | * | 10/1999 | Muller et al. | 372/10 |
| 6,137,813 A | * | 10/2000 | Ionov et al. | 372/6 |
| 6,200,309 B1 | * | 3/2001 | Rice et al. | 372/3 |
| 6,347,100 B1 | * | 2/2002 | Sanders et al. | 372/6 |
| 6,404,785 B1 | * | 6/2002 | Scheps | 372/21 |

OTHER PUBLICATIONS

Setzler, Budni, and Chicklis, "A High Energy Q–switched Erbium Laser at 1.62 Microns", *Advanced Solid–State Lasers*, Technical Digest, Jan. 28, 2001, Publisher: Optical Society of America Published in: US.

Spariosu, Kalin and Birnbaum, Milton, "Room–Temperature 1,6444 Micron Er: YAG Lasers", *OSA Proceedings on Advanced Solid–State Lasers*, 1992, Page(s): 127–, vol. 13, Publisher: Center for Laser Studies, University of Southern California, Published in: US.

Spariosu, Kalin and Birnbaum, Milton, "Intracavity 1.549–um Pumped 1.634–um Er: YAG Lasers at 300 K", *IEEE Journal of Quantum Electronics*, 1994, vol. 30, No. 4, Publisher: Center for Laser Studies, University of Southern California, Published in: US.

\* cited by examiner

*Primary Examiner*—Don Wong
*Assistant Examiner*—Hung Tran Vy
(74) *Attorney, Agent, or Firm*—James R. Young

(57) ABSTRACT

A laser device for producing laser radiation at an eyesafe wavelength from a diode-pumped solid-state laser. The device consists of three stages. The first stage is a laser diode whose output pumps the second stage. The second stage is a guided-wave laser or guided-wave Raman-shifted laser whose output pumps into the upper laser level of the Erbium laser dopant of the third stage. The third stage is an Erbium-doped solid-state crystalline-host laser whose output wavelength is in the eyesafe region. One embodiment of the device is: a cw laser diode with a wavelength in the range 0.9 to 1.0 microns, which pumps a guided-wave laser doped with Ytterbium and Erbium that produces laser output with a wavelength near 1.5 microns, which further pumps an Erbium-doped crystal laser that produces laser output with a wavelength in the eyesafe region near 1.6 microns.

48 Claims, 9 Drawing Sheets

EYESAFE Q-SWITCHED ER-DOPED SOLID-STATE LASER

FIELD OF THE INVENTION

This invention relates to lasers and, more particularly, to a method and apparatus for producing eyesafe high-peak-power laser radiation from a diode-pumped solid-state laser.

BACKGROUND OF THE INVENTION

Diode-pumped solid-state lasers are generally considered the most practical source of laser radiation for applications requiring high efficiency and compact, low-weight, and rugged packaging. Laser diode pump sources have high electrical-to-optical conversion efficiency, and the narrow-band spectral output of laser diodes can be chosen to closely match the absorption bands of solid-state laser materials. As a result, heat loads in diode-pumped solid-state lasers are significantly lower than for the flashlamp-pumped solid-state lasers that have been largely supplanted by diode-pumped lasers for applications requiring compactness and high efficiency.

For many applications the laser radiation must be in the "eyesafe" band, that is having a wavelength longer than 1.4 microns. Laser radiation in this range is strongly absorbed by liquid water. As the fluid in the human eye consists primarily of water, laser radiation in this range does not damage the retina because it is absorbed before reaching the retina.

Several solid-state lasers operate in the eyesafe band, have absorption features suitable for diode pumping, and have millisecond duration fluorescence lifetimes. These lasers are doped with trivalent rare-earth ions and are well-known. An advantage of these lasers is that their long fluorescence lifetimes (i.e. energy storage times) readily allow the production of high-energy Q-switched pulses, and their relatively low emission cross-sections result in pulsewidths that are hundreds of nanoseconds in duration. These pulsewidths are ideal for active remote sensing instrumentation such as coherent detection laser radar systems. Examples of these lasers include:

1) the 1.53-micron ytterbium/erbium co-doped glass (Yb, Er:glass) laser
2) the 2.05-micron thulium/holmium co-doped yttrium lithium fluoride (Tm,Ho:YLF) laser
3) the 2.01-micron thulium-doped yttrium aluminum garnet (Tm:YAG) laser
4) the upper-state-pumped 2.10-micron Ho:YAG laser
5) the upper-state-pumped 1.6-micron erbium-doped bulk crystal (for example, Er:YAG) laser.

Existing eyesafe diode-pumped solid-state lasers have deficiencies that make them non-ideal for critical applications such as remote sensing.

The 1.53-micron Yb,Er:glass laser does not perform well at high average power owing to the poor thermo-mechanical properties of the glass host material. This limits operation of the laser to low pulse repetition frequencies (PRF), thereby severely limiting the sensitivity of remote sensing systems based on this laser.

In the 2.05-micron Tm,Ho:YLF laser, the Tm ion absorbs the pump light and transfers the excitation energy to the lasant Ho ion. This laser suffers from upconversion loss from the upper laser state between pairs of Tm and Ho ions, which reduces the efficiency and energy storage capacity of the laser medium. Energy storage is an important consideration for applications such as remote sensing (where high energy laser pulses enable long-range sensing), because a long energy storage lifetime is required to convert the intrinsically continuous wave (cw) or quasi-cw laser diode pump power into high peak power. In typical Tm,Ho:YLF lasers the energy storage time is reduced from an intrinsic lifetime of 10 ms by upconversion to a lifetime of approximately 1 ms.

The 2.01-micron Tm:YAG laser similarly suffers from upconversion loss, in this case between pairs of Tm ions in the upper laser state. As a result the energy storage lifetime in a typical Tm:YAG laser is reduced from an intrinsic lifetime of 8 ms by upconversion to approximately 3 ms.

The detrimental effects of upconversion loss can be eliminated by pumping the Ho:YAG laser directly into its upper laser state. In this case a low concentration of Ho can be utilized, which suppresses the concentration-dependent upconversion process. The Ho:YAG laser can not be operated efficiently when pumped directly into the upper state by laser diodes, however, because presently there are no laser diodes with sufficiently high power and brightness in the wavelength range (1.85 to 1.95 microns) of strong absorption for efficient upper-state pumping of Ho:YAG. Instead, the Ho:YAG laser must be pumped by an intermediate solid-state laser, for example the 1.94-micron Tm:YALO laser or the 1.91-micron Tm:YLF laser. These lasers have sufficient brightness for pumping the Ho:YAG laser, but have the disadvantage of requiring liquid coolants.

The upper-state-pumped 1.6-micron Er-doped bulk crystal laser operates in a similar fashion to that of the upper-state-pumped Ho:YAG laser. In the case of the Er-doped laser strong absorption for upper-state pumping occurs at 1.533 microns. As in the case of the Ho:YAG laser, laser diodes do not exist presently with sufficiently high power and brightness for efficient upper-state pumping of the Er-doped laser.

A need has existed for many years for efficient eyesafe lasers suitable for remote sensing applications. Such devices are required to operate in the Q-switched mode with high pulse energy and long pulsewidth (hundreds of nanoseconds). In recent years development efforts for such devices have concentrated on solid-state lasers operating at wavelengths near 2 microns. The 2.01-micron Tm:YAG laser and the 2.05-micron Tm,Ho:YLF laser (and variations on these such as the 2.02-micron Tm:LuAG laser) are generally considered to be the most practical sources of efficient, eyesafe, high-energy, long-pulsewidth, Q-switched laser radiation.

In particular, the upper-state pumped 1.6-micron Er-doped bulk crystal laser has been considered to be impractical owing to the lack of a suitable pump source. The 1.6-micron Er-doped laser is known to operate with two pump sources: 1) flashlamp-pumped Yb,Er:glass lasers, and 2) 1.5-micron InGaAs laser diodes. Neither of these pump devices provides output radiation that is suitable for efficient operation of the 1.6-micron Er-doped laser. High-power Yb,Er-doped, Raman-shifted Yb-doped and Raman-shifted Nd-doped fiber lasers have been commercially available for several years; however, these devices have not been previously proposed as pump sources for the upper-state pumped 1.6-micron Er-doped laser. Use of guided-wave lasers, such as fiber lasers (typically having a doped core of circular cross section) and bulk waveguide lasers (typically having a doped region of rectangular cross section), as the pump source is an aspect of the subject invention. In a guided-wave laser the laser radiation is confined to the laser medium (which occupies the same space as the laser resonator) by total internal reflection from the transverse surfaces of the guided-wave structure. The guided-wave geometry is in contrast to conventional lasers in which the laser resonator is defined by discrete mirrors at the ends of a free-space resonator. Guided-wave lasers have the advantage of a small resonator cross section that results in a low laser threshold and efficient removal of heat from the laser medium. An aspect of the present invention is that the pump source of the Er-doped bulk crystal laser is either a Yb,Er-doped guided-wave laser, a Raman-shifted Yb-doped guided-wave laser, or a Raman-shifted Nd-doped guided-wave laser.

A suitable pump laser for the Er-doped laser must meet the following requirements: 1) the pump laser must have sufficiently high electrical-to-optical conversion efficiency, 2) the pump laser must be of small size and low weight, 3) the pump wavelength must be strongly absorbed by the Er-doped laser material, 4) the pump brightness must be sufficiently high for efficient pumping of the Er-doped laser medium, and 5) the pump linewidth must be sufficiently narrow for efficient pumping of the Er-doped laser medium. The flashlamp-pumped Yb,Er:glass pump laser does not meet requirements 1 and 2, while the InGaAs pump laser does not meet requirements 4 and 5.

The flashlamp-pumped Yb,Er:glass laser is known to be impractical as a pump source, because of the large size and weight, and low efficiency of these devices, and also because of the short operational lifetime of flashlamps. Therefore, investigations into the use of the flashlamp-pumped Yb,Er:glass laser as a pump source for the Er-doped bulk crystal laser are considered to be a precursor for direct pumping of the Er-doped laser with 1.5-micron InGaAs laser diodes. However, owing to the unconventional nature of the 1.6-micron Er-doped laser, it is not generally recognized that direct pumping with 1.5-micron laser diodes imposes serious limitations on the performance of the Er-doped laser. Such limitations include: 1) 1.5-micron laser diodes have insufficient brightness for pumping the Er-doped laser, owing to the necessity of avoiding upconversion loss in the Er-doped laser material by utilizing a low Er doping concentration which requires the use of a laser rod having a length greater than the depth of focus of the laser diode pump light, and 2) 1.5-micron laser diodes typically have linewidths greater than 5 nm, making them unsuitable for efficient absorption by the Er-doped laser medium which has a substantially narrower absorption linewidth of approximately 1 nm.

Examples of the use of the flashlamp-pumped Yb,Er:glass laser to pump the 1.6 micron Er:YAG laser are given in two papers by K. Spariosu and M. Bimbaum: 1) in "IEEE Journal of Quantum Electronics," Volume 30, pages 1044–1049, April, 1994, and 2) in OSA Proceedings on Advanced Solid-State Lasers, Volume 13, pages 127–130, 1992.

Thus, there is a need in the art for an efficiently operated upper state pumped 1.6 micron Er-doped laser. The present invention meets these and other needs in the art

SUMMARY OF THE INVENTION

It is an aspect of the present invention to produce eyesafe laser radiation from an Er-doped bulk crystal laser device by pumping the Er-doped laser device with a guided-wave laser device, for example a circular-core fiber laser or a waveguide laser (such as a waveguide with rectangular cross section).

It is another aspect of the invention to operate the laser in the Q-switched mode.

Another aspect of the invention is to provide high peak power output from the laser device.

The above and other aspects of the invention are accomplished in a method and apparatus for producing laser radiation with high peak power at an eyesafe wavelength from a diode-pumped solid-state laser. The Er-doped laser is a well-known source of laser radiation operating at an eyesafe wavelength of 1.6 microns. The method and apparatus uses a cw 0.9 to 1.0 micron wavelength laser diode to pump a Yb,Er-doped fiber laser or a Raman-shifted Yb-doped fiber laser or a Raman-shifted Nd-doped fiber laser at a wavelength in the range 1.45 microns to 1.54 microns. The fiber laser further pumps the Er-doped laser to produce high peak power at an eyesafe wavelength of 1.6 microns.

BREIF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

The present invention relates to a method and apparatus for producing laser radiation with high peak power at an eyesafe wavelength from a diode-pumped solid-state laser. The Er:YAG laser is a well-known source of laser radiation operating at an eyesafe wavelength of 1.6 microns. This laser has been shown to operate with low output power in the continuous wave (cw) mode when pumped by a laser diode operating at a wavelength of 1.533 microns. This operating scheme can not be utilized, however, to efficiently produce laser output with the high peak power required for applications such as remote sensing. The present invention produces an eyesafe laser output with high peak power from the 1.6-micron Er-doped bulk crystal laser by pumping the Er-doped laser with a 1.533-micron guided-wave laser such as the Yb,Er-doped fiber laser or the Raman-shifted Yb-doped fiber laser or the Raman-shifted Nd-doped fiber laser. The fiber laser is pumped by a cw 0.9 to 1.0 micron wavelength laser diode. A block diagram of the invention is shown in FIG. 1.

Figure 1:
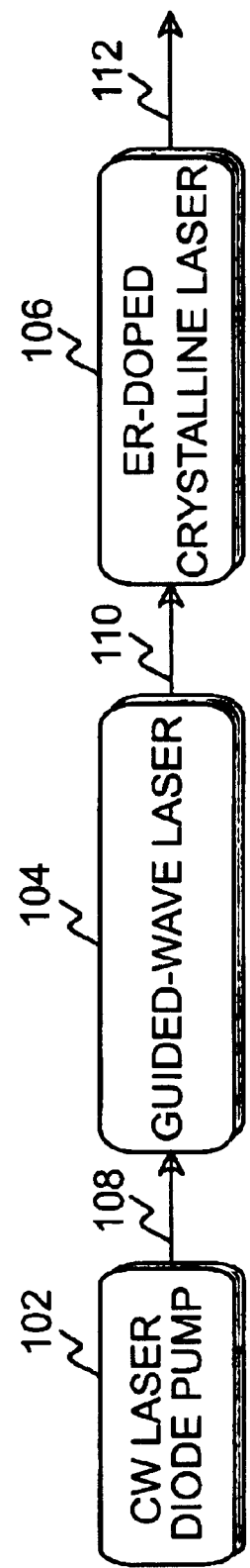
FIG. 1 shows a block diagram of the invention.

Referring to FIG. 1, a solid state diode laser 102 is used to pump a fiber laser 104, which is then used to pump an Er-doped laser 106. The Er-doped laser then produces the desired output emission 112.

This invention takes advantage of the high output power, excellent beam quality, and narrow linewidth output 110 of the diode-pumped fiber laser. These properties are required for obtaining high peak power output 112 from the Er-doped laser, and can not be achieved by direct pumping with the 1.533-micron output 108 from the laser diode 102.

Diode-pumped solid-state lasers operate most efficiently when in the end-pumped configuration. In this configuration the propagation direction of the laser diode pump radiation into the laser medium is coincident with the propagation direction of the laser radiation within the laser medium. In the conventional geometry the laser medium is a cylindrical rod with an axis parallel to the propagation direction of the laser radiation. In the end-pumped geometry the pump laser radiation has a strong degree of overlap with the output laser radiation, thereby providing the most efficient conversion of the pump radiation to output radiation.

A fundamental requirement for the end-pumping configuration is that the pump source must have sufficiently high brightness to achieve the laser threshold condition. Pump brightness is inversely proportional to the beam quality parameter $M^2$, given by $$M^2 = \pi w_0 \theta / \lambda$$

where $w_0$ is the pump spot radius at focus, $\theta$ is the half-angle far-field divergence of the beam, and $\lambda$ is the pump wavelength. The brightness is therefore a measure of the depth of focus that can be achieved for a given pump spot size. A diffraction-limited beam has the highest possible brightness, with an $M^2$ value of unity. That is, a beam with an $M^2$ value of 100 has a brightness 100 times lower than a diffraction-limited beam.

The output radiation from high-power laser diodes is incoherent over the emission aperture, resulting in $M^2$ values for these devices significantly higher than unity. For example, a typical high-power (15 W) fiber-coupled laser diode device has a wavelength of 0.80 microns, a fiber bundle diameter of 0.80 mm, and a half-angle divergence of 0.12 radians. This device has a beam quality of $M^2 = 190$. This property of high-power laser diode devices makes them unsuitable for pumping the Er:YAG laser, which simultaneously requires a small pump spot size and a large depth of focus.

Figure 2:
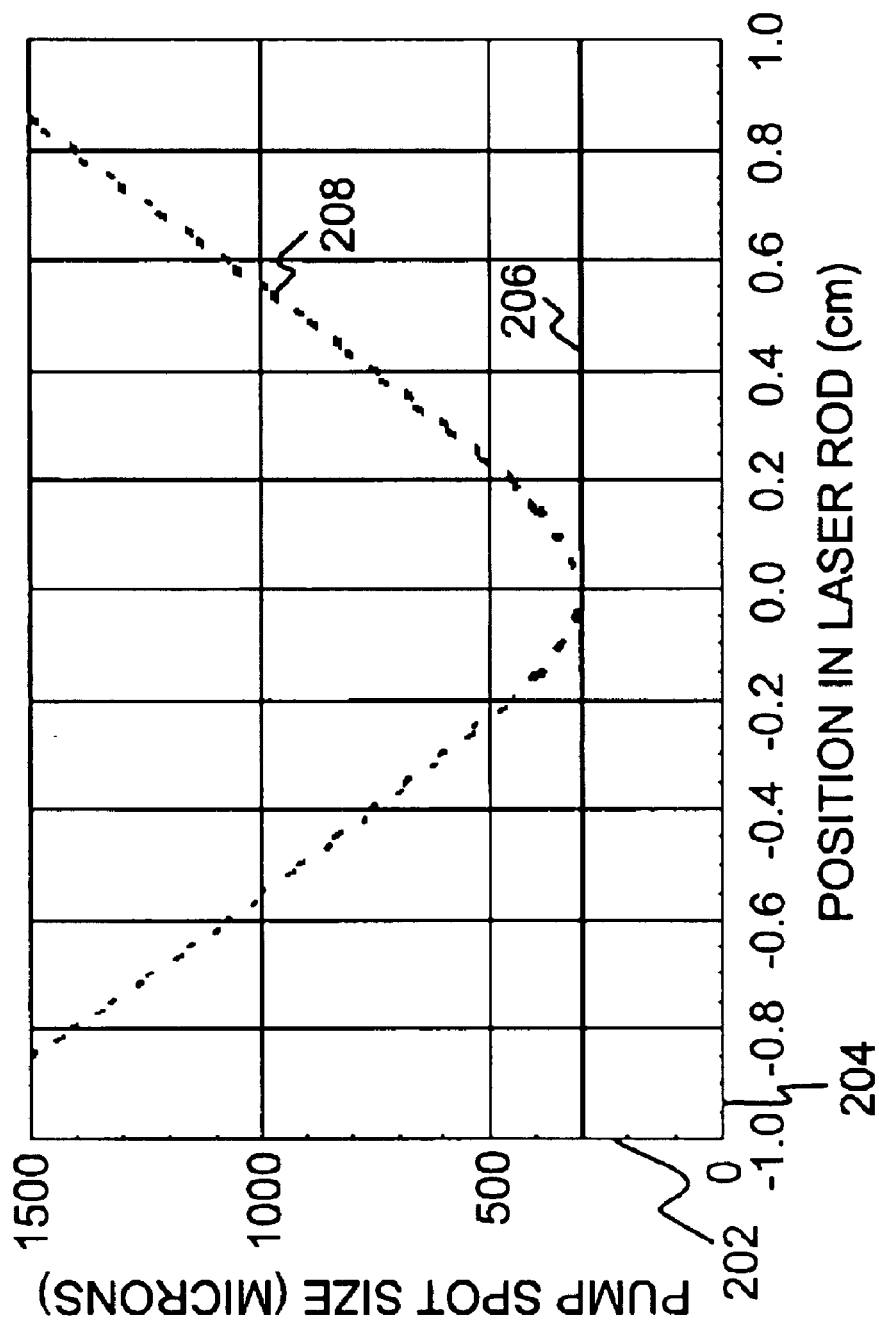
FIG. 2 shows the impact of beam quality of the pump source for the 1.6-micron Er-doped laser.

FIG. 2 illustrates the impact of the beam quality of the pump source for the 1.6-micron Er:YAG laser. Referring to FIG. 2, the y-axis 202 illustrates the pump spot size over a range of 0 to 1500 microns while the x-axis 204 illustrates the position of the beam in the laser rod over a span of 2 cm. As will be described below, a moderate-power Er:YAG laser requires a pump spot size of 300 microns and a depth of focus of 2 cm. Spot size as a function of position in the laser rod is shown in FIG. 2 with the beam focused at the center of the rod. The solid curve 206 shows the spot size for a diffraction-limited beam ($M^2 = 1$). This curve represents pumping with a diffraction-limited fiber laser pump. The pump spot is essentially perfectly collimated over the required 2-cm length of the laser rod, thereby yielding nearly perfect overlap of the pump and laser modes. The dashed curve 208 shows the spot size for a typical laser diode pump beam, with $M^2 = 190$. For the laser diode the pump spot varies significantly over the required 2-cm laser rod length, resulting in a very poor overlap of the pump and laser modes. As a result the Er:YAG laser can not reach threshold when pumped by a high-power laser diode, owing to the significantly lower brightness of high-power laser diode devices in comparison with a diffraction-limited laser such as a fiber laser.

While FIG. 2 clearly shows that the low beam quality (high $M^2$) of a laser diode pump is not suitable for pumping the Er:YAG laser, a diffraction-limited ($M^2 = 1$) pump beam is not required. An $M^2$ value of 10, for example, will have sufficiently high brightness for pumping the Er:YAG laser. As a result the performance requirements on the fiber laser pump can be relaxed, thereby enabling manufacturing of the fiber laser at lower cost.

A fundamental requirement for efficient conversion of the pump radiation into laser output is that a significant fraction of the pump radiation be absorbed by the solid-state laser medium. In the case of the end-pumped geometry, the fraction of pump light $\eta_a$ absorbed by the laser rod is given by $$\eta_a = 1 - \exp(-\alpha L) \qquad (1)$$

where $\alpha$ is the absorption coefficient of the laser medium, and L is the length of the laser rod.

The absorption coefficient is given by $$\alpha = N\sigma \qquad (2)$$

where N is the number density of the active ion doped into the laser crystal, and $\sigma$ is the adsorption cross-section of the laser transition. The absorption cross-section is a material property of the laser medium, fixed for a given host crystal, dopant ion type, and laser wavelength. Therefore, for a given laser transition, the absorption coefficient $\alpha$ can be varied only by changing the number density N. As a result, for a fixed N, $\eta_a$ can be varied only by changing the laser rod length L.

It is to be understood that for optimum performance of the 1.6-micron Er-doped bulk crystal laser, the Er ion concentration should not substantially exceed a value of 2% for efficient operation of the 1.6-micron ErYAG laser. For higher dopant concentrations, upconversion loss from the upper laser state reduces the effective energy storage time and, therefore, the laser efficiency. The storage lifetime reduction is detrimental to high-energy (and thereby high peak-power) Q-switched operation, because the Q-switched pulse energy E is related to the effective storage lifetime $\tau$ by $$E = P\tau,$$

where P is the laser average output power.

Figure 3:
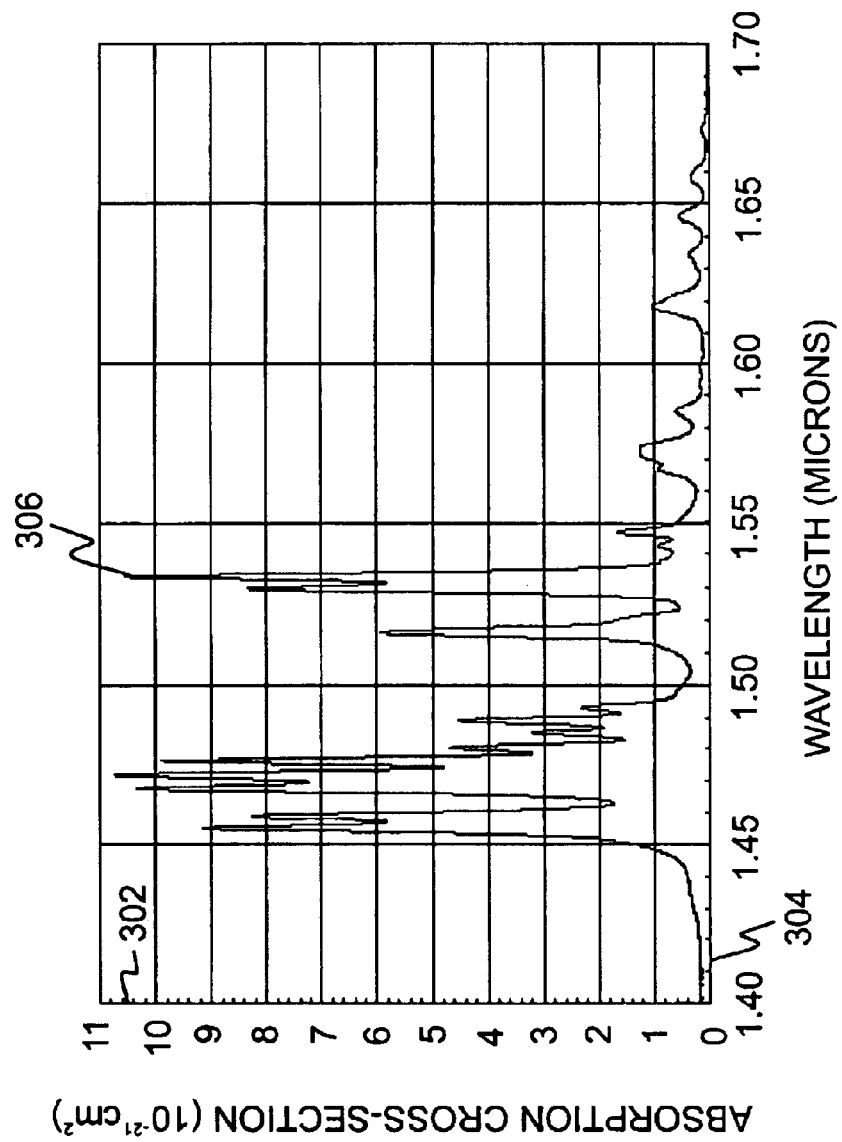
FIG. 3 shows the absorption spectrum for Er:YAG material.

Given this limit on the value of N, Equations (1) and (2) determine the minimum length of the laser rod L for a given value of $\eta_a$. The absorption spectrum for Er:YAG is shown in FIG. 3. Referring to FIG. 3, the absorption cross-section $\sigma$ is plotted on the y-axis 302 versus wavelength on the x-axis 304. The absorption peak 306 at wavelength 1.533 microns is the most suitable for pumping. Those skilled in the art will recognize, however, that if practical pump sources in the range 1.45 microns to 1.54 microns become available they would be suitable for pumping the Er:YAG laser in the manner described herein.

The peak absorption cross-section at wavelength 1.533 microns is $\sigma = 10.5 \times 10^{-21}$ cm$^2$. For a 1% concentration of Er ions in YAG, the number density $N = 1.39 \times 10^{20}$ cm$^{-3}$. Therefore the absorption coefficient at wavelength 1.533 microns in 1% Er:YAG is $\alpha = 1.46$ cm$^{-1}$. Using Equation (1), for 95% absorption of the pump radiation ($\eta_a = 95\%$), a laser rod length of at least 2.0 cm is required.

Figure 4:
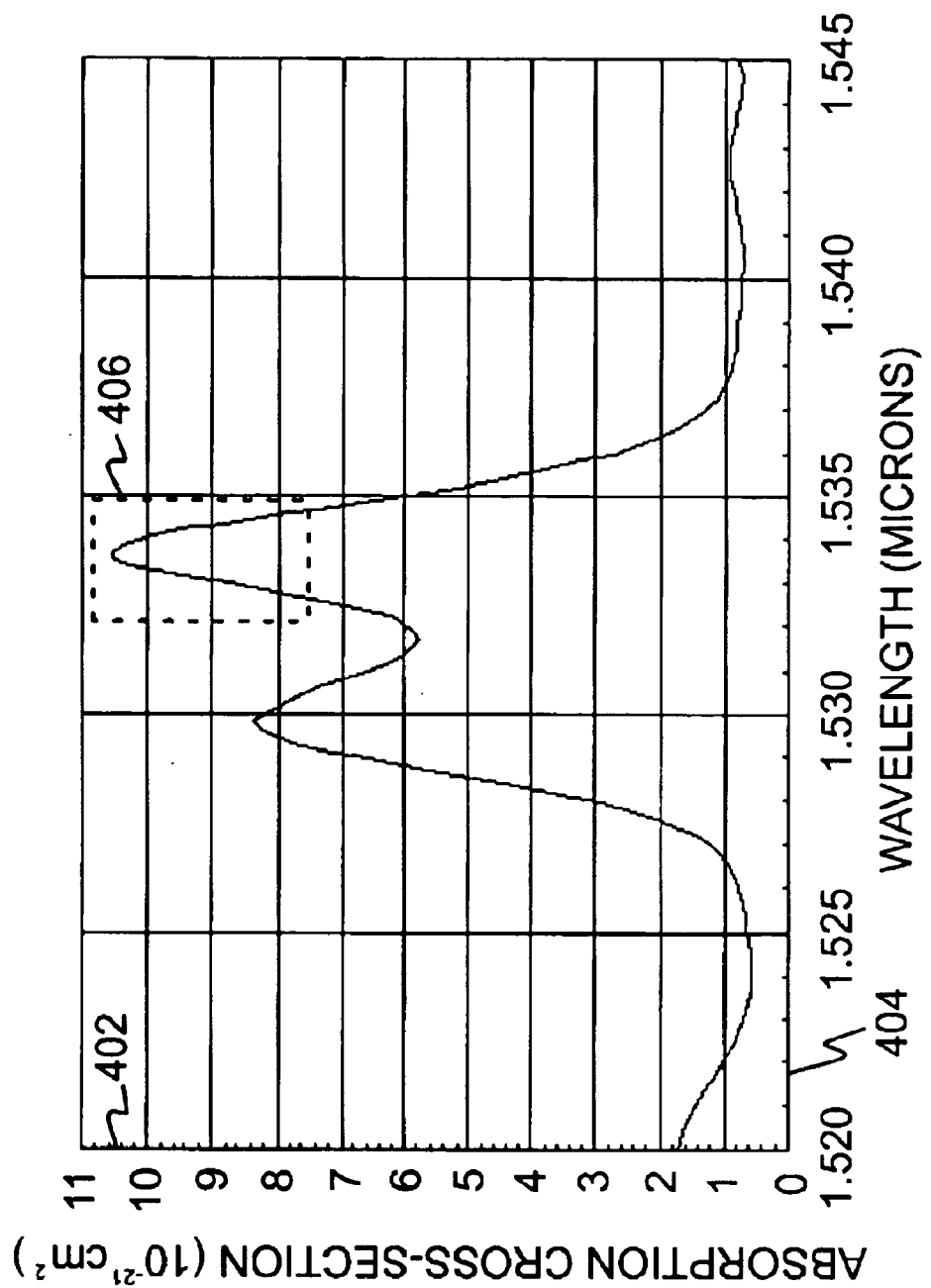
FIG. 4 shows the Er:YAG absorption spectrum with an expanded wavelength scale.

FIG. 4 shows the Er:YAG absorption spectrum of FIG. 3 using an expanded wavelength scale on the x-axis 404. This Figure illustrates an additional advantage of the fiber laser pump over the laser diode pump. The high-power Yb,Er-doped fiber laser has a linewidth of 0.0002 microns, while a typical high-power laser diode has a linewidth of 0.003 microns. As box 406 in FIG. 4 shows, the strength of the Er:YAG absorption peak at the 1.533 micron wavelength varies considerably over a 0.003-micron range. This effectively reduces the absorption coefficient for laser diode pumping, thereby requiring the use of a longer laser rod for efficient pump absorption. This imposes an additional brightness requirement on the pump beam for laser diode pumping.

The laser threshold power $P_{th}$, for a quasi-three-level laser is given by $$P_{th}=[\pi h v_p(w_L^2+w_p^2)/4\tau\eta_a][T/\sigma_e+2LN(f_L/f_U)]$$

where $hv_p$ is the pump photon energy, $W_L$ is the laser spot size, $w_P$ is the pump spot size, $\tau$ is the laser upper-state lifetime, T is the laser output coupling, $\sigma_e$ is the laser transition stimulated emission cross-section, and $f_L$ and $f_U$ are the Boltzmann population fractions of the lower and upper laser levels respectively.

For the 1.6-micron Er:YAG laser, the upper-state lifetime is 8 ms, the Boltzmann ratio $f_L/f_U$ ratio $f_L/f_U$ is 0.103 at a temperature of 300 K, and the emission cross-section is $5.1\times10^{-21}$ cm$^2$. For a laser rod length of 2.0 cm, an Er concentration of 1.0%, an output coupling of 20%, and pump and laser spot sizes of 300 microns, the Er:YAG laser threshold is 2.4 W. This is an acceptably small threshold for a moderately high-power laser pumped by a 15-W fiber laser. In particular, the use of a larger pump spot size, for the purpose of relaxing the pump depth of focus requirement, will result in an unacceptably high laser threshold. In particular, the required threshold would be tens of watts for currently available laser diode pumps rather than a few watts for the fiber laser pump.

Figure 5:
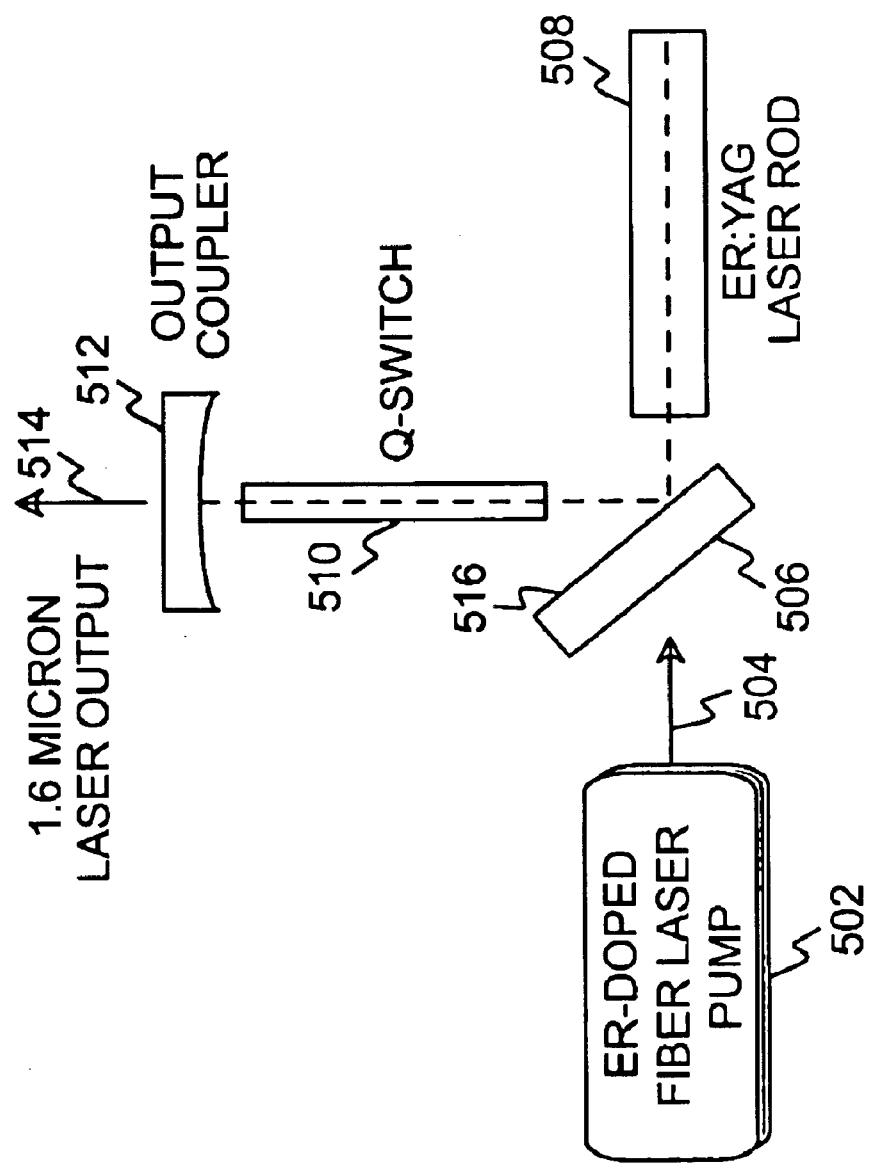
FIG. 5 shows a schematic diagram of a one embodiment of the upper-state pumped 1.6-micron Er-doped laser.

A schematic diagram of one embodiment of the upper-state pumped 1.6-micron Er:YAG laser is shown in FIG. 5. Referring to FIG. 5, the pump emission 504 from the 1.533-micron Yb,Er-doped fiber laser 502 is coupled into the Er:YAG laser rod 508 through a dichroic mirror 506 with a surface 516 that has high reflection at 1.6 micron and high transmission at 1.533 micron.

The Yb,Er-doped fiber laser 502 is tuned to the 1.533-micron absorption peak by an intracavity Bragg grating (not shown in FIG. 5). In this configuration the fiber laser emission 504 linewidth is typically less than 0.0002 micron. The center wavelength of the fiber laser output 504 can be specified to within 0.0001 micron, and is insensitive to temperature variations. The 1.533-micron wavelength coincides with one of the channels (channel #55) specified for Dense Wavelength Division Multiplexing (DWDM) by the International Telecommunications Union (ITU). Therefore fiber Bragg gratings are readily available for this optimum pump wavelength. The Q-switch 510 can be used to produce high peak power output, and can be of any type, including but not restricted to acousto-optic, electro-optic, or passive (saturable absorber).

Figure 6:
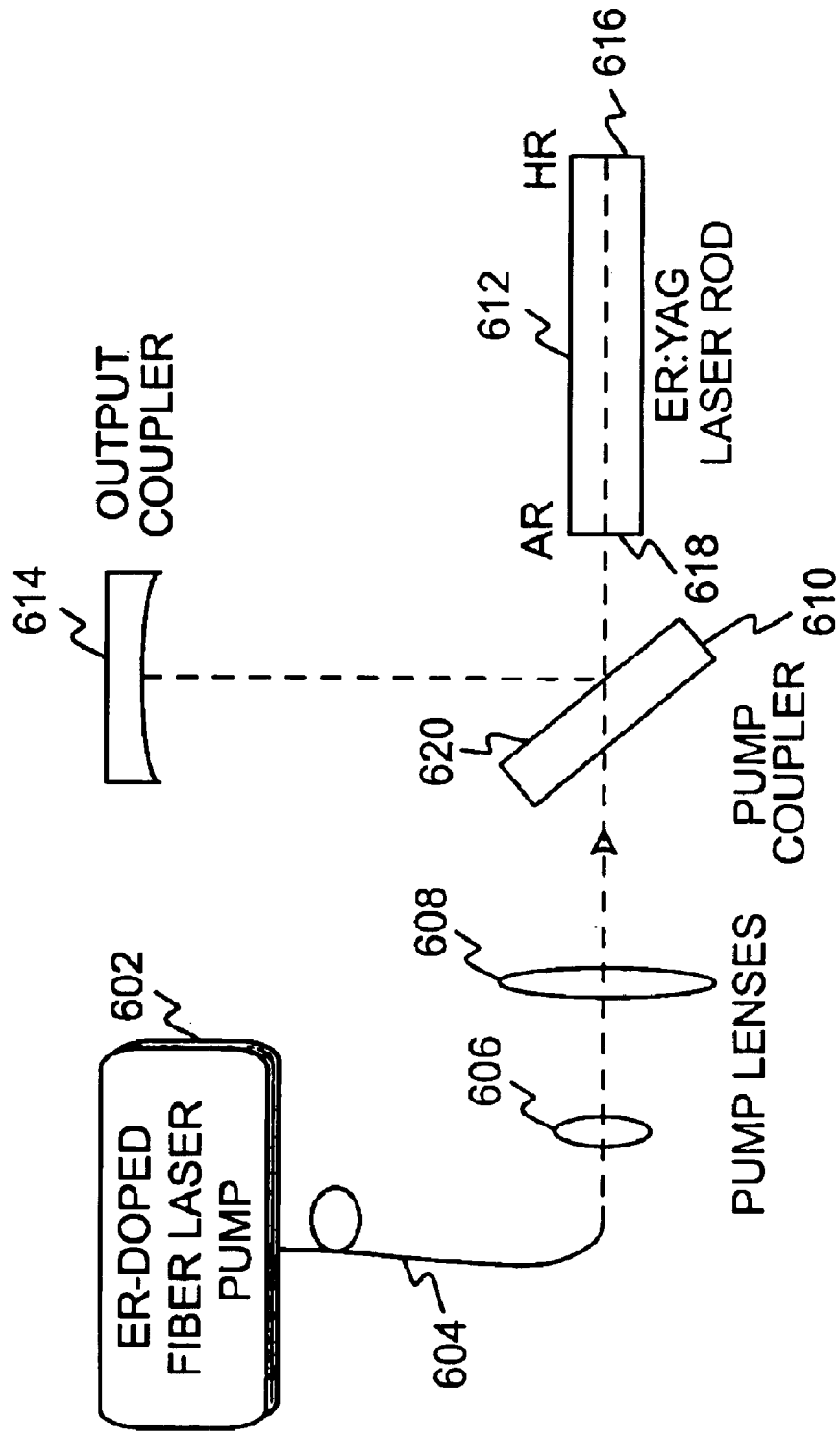
FIG. 6 shows a schematic diagram of a test configuration of the upper-state pumped Er:YAG laser.

A schematic diagram of a system used to test the upper-state pumped Er:YAG laser is shown in FIG. 6. Referring to FIG. 6, the Er:YAG laser resonator is of the simple hemispheric type, defined by the highly reflecting plano end surface 616 of the laser rod 612, and the output coupler 614 with a 10-cm radius of curvature, and the plano fold mirror 610.

The fold mirror 610 has a polarized dichroic coating on surface 620, which couples the pump light into the Er:YAG resonator. The coating on surface 620 is highly reflecting for s polarization at the 1.6-micron Er:YAG laser wavelength, and highly transmitting for p polarization at the 1.533-micron pump wavelength.

The pair of pump lenses 606 and 608 shown in FIG. 6 are used to magnify the fiber laser emission 604 spot to a size appropriate for efficient pumping of the Er:YAG laser. The fiber laser beam 604 waist can be determined by measuring the divergence of the fiber laser beam. The divergence in the example of FIG. 6, measured directly from the fiber 602 with no coupling optics, was 0.098 radians (5.6 degrees), corresponding to a beam waist of 5.0 micron. The collimating lens 606 has a focal length of 1.8 cm, and the focusing lens 608 has a focal length of 20.0 cm, giving a nominal magnification of 11.1, and therefore a nominal pump beam waist of 56 microns in the Er:YAG laser rod. The longitudinal positions of the pump lenses are adjustable, allowing variation of the actual beam waist over the range 50 to 80 microns. For the laser tests of FIG. 6, a pump beam waist of 80 µm was utilized.

The plano back end surface 616 of the Er YAG laser rod is highly reflecting at both the 1.533-micron pump and the 1.6-micron laser wavelengths. The plano front end surface 618 of the laser rod is anti-reflecting at both wavelengths. The laser resonator mode has its waist at the back surface 616 of the rod. The overlap of the pump and laser modes is optimum when the pump mode is focused near the back surface 616. The pump spot size varies from 80 microns at the back end 616 of the rod to 110 microns at the front end 618 of the rod. The Er:YAG laser spot size was optimized by adjusting the longitudinal position of the output coupler 614. At the optimal position, the laser mode waist was 70 micron, as determined from a measurement of the divergence of the output beam. The laser spot size varies from 70 microns at the back end of the rod to 115 microns at the front end of the rod. Therefore the overlap of the pump and Er:YAG laser modes was near optimum.

Those skilled in the art will recognize that modifications to the embodiment described above can be made. For example, the laser cavity can be linear rather than folded as shown in FIG. 6. The pump and resonator spot sizes can be scaled to a larger area in proportion to the power available from the pump laser. A range of Er dopant concentrations, with corresponding laser rod lengths determined by the equations shown above, can also be utilized. A variety of crystalline hosts in addition to YAG can also be utilized.

Figure 7:
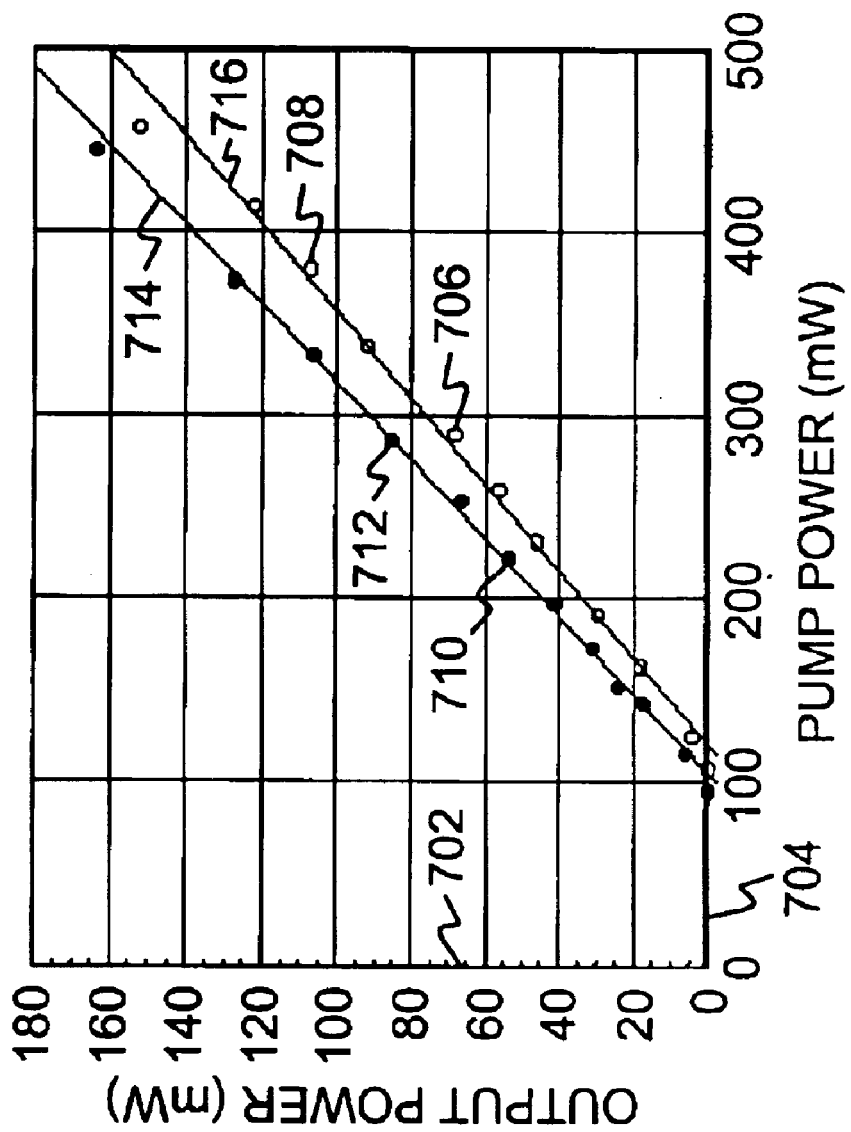
FIG. 7 shows continuous wave performance of the upper-state pumped Er:YAG laser for a laser rod temperature of −40° C.

The cw performance of the upper-state pumped Er:YAG laser for a laser rod temperature of −40° C. is shown in FIG. 7. Referring to FIG. 7, the output power 702 is plotted as a function of pump power 704. The open circles, for example circles 706 and 708, are measured with a 5% output coupling, the filled circles, for example circles 710 and 712, are measured with an 8% output coupling. The line 714 is a linear least-squares fit to the filled circles, and the line 716 is a linear least-squares fit to the open circle measurements. The slope efficiencies, extracted from the least-squares fits, are 42.5% for an output coupling of 5%, and 47.1% for an output coupling of 8%.

Figure 8:
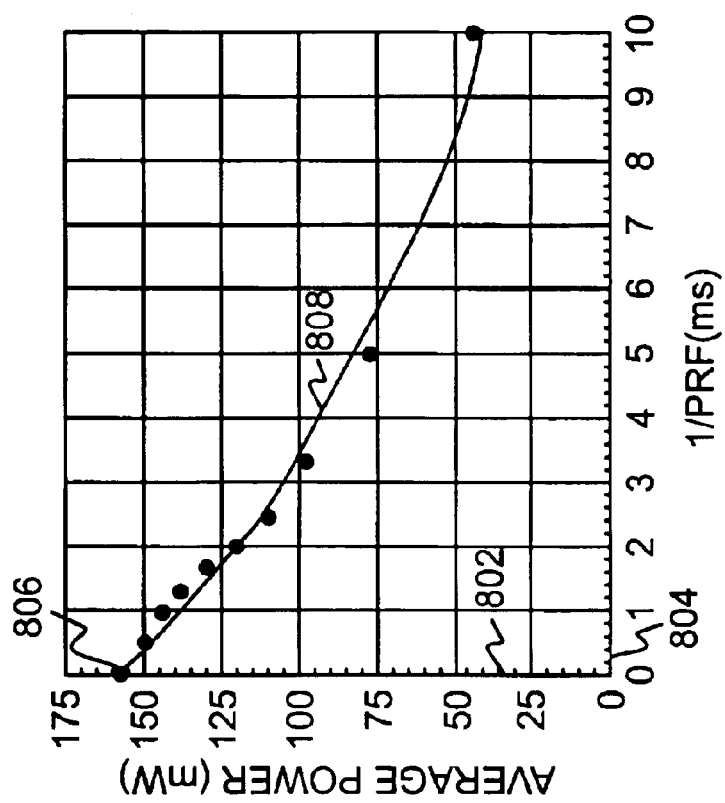
FIG. 8 shows the output from the 1.6-micron Er:YAG laser in the Q-switched mode plotted as average power.

The average output power 802 from the 1.6-micron Er:YAG laser in the Q-switched mode is shown in FIG. 8, as a function of the reciprocal of the laser pulse repetition frequency (PRF) 804. An acousto-optic (AO) Q-switch (not shown in FIG. 6, but inserted in the laser resonator as shown in FIG. 5) was used for this example. The output power in the cw mode is indicated by the data point 806 for I/PRF= zero, showing that the high-PRF efficiency is consistent with that for cw operation. The solid line 808 is an exponential least-squares fit to the data. The fit gives an effective energy storage lifetime of 3.3 ms.

Figure 9:
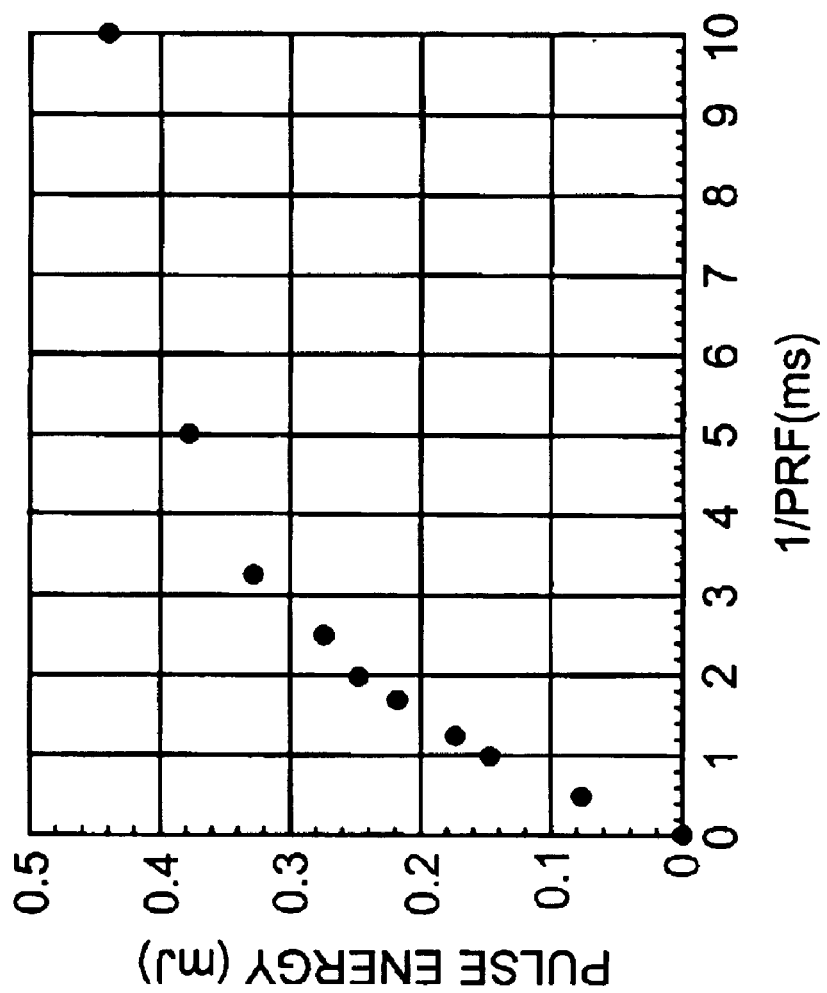
FIG. 9 shows the same data as shows in FIG. 8, but plotted terms of pulse energy.

For clarity, the same data from FIG. 8 are plotted in FIG. 9 in terms of pulse energy rather than average output power.

The effective energy storage lifetime is limited to 3.3 ms for these measurements owing to cooperative upconversion loss from the laser upper state. For these measurements the Er concentration is 0.5%. It is expected that energy storage for the fill intrinsic upper state lifetime (8 ms) will be possible for Er:YAG material with even lower Er concentrations. The pump brightness requirement is even more critical for lower dopant concentrations, because lower dopant concentration requires a longer laser rod, which requires a lower $M^2$.

Beam quality measurements were made on the Er:YAG laser described above. The measured $M^2$ value was 1.0±0.1; that is, no deviation from diffraction-limited performance was observed. This property of the Er:YAG laser is particularly important for remote sensing applications utilizing coherent detection.

Having thus described a presently preferred embodiment of the present invention, it will be understood by those skilled in the art that many changes in construction and geometry and widely differing embodiments and applications of the invention will suggest themselves without departing from the scope of the present invention as defined in the claims. The disclosures and the description herein are intended to be illustrative 115 and are not in any sense limiting of the invention, defined in scope by the following claims.

What is claimed is:

1. A method for producing laser radiation from an Er-doped solid-state crystal laser device, the method comprising the steps of:
   (a) activating a laser diode to produce an output emission having a predetermined wavelength;
   (b) coupling a guided-wave laser to receive the output emission of the laser diode, wherein the output emission of the laser diode stimulates the guided-wave laser to produce a guided-wave laser output emission;
   (c) coupling the guided-wave laser output emission to upper-state pump the Er-doped solid-state crystal laser device, wherein the guided-wave laser output emission stimulates the solid-state crystal laser device to produce the laser radiation.

2. The method of claim 1, wherein the Er-doped solid-state crystal comprises material selected from the group of yttrium aluminum garnet (YAG), yttrium scandium gallium garnet (YSGG), gadolinium scandium gallium garnet (GSGG), gadolinium scandium aluminum garnet (GSAG), gadolinium gallium garnet (GGG), lutetium aluminum garnet (LuAG), yttrium gallium garnet (YGG), yttrium aluminum oxide (YALO), yttrium vanadate (YVO$_4$) and yttrium lithium flouride (YLF).

3. The method of claim 1, wherein the Er-doped solid-state crystal comprises material selected from the group of yttrium aluminum garnet (YAG), yttrium scandium gallium garnet (YSGG), and gadolinium scandium gallium garnet (GSGG).

4. The method of claim 1, wherein the Er-doped solid-state crystal comprises yttrium aluminum garnet (YAG).

5. The method of claim 1 wherein the guided-wave laser comprises an Yb,Er-doped fiber laser.

6. The method of claim 1 wherein the guided-wave laser comprises an Yb,Er-doped waveguide laser.

7. The method of claim 1 wherein the output emission of the laser diode is limited to a wavelength of 0.9 to 1.0 microns.

8. The method of claim 1 wherein the output emission of the laser diode is limited to a wavelength of 0.96 to 0.98 microns.

9. The method of claim 1 wherein the guided-wave laser comprises a Raman-shifted Yb-doped fiber laser.

10. The method of claim 1 wherein the guided-wave laser comprises a Raman shifted waveguide laser.

11. The method of claim 1 wherein the guided-wave laser comprises a Raman-shifted Nd-doped fiber laser.

12. The method of claim 1 wherein the guided-wave laser comprises a Raman-shifted Nd-doped waveguide laser.

13. The method of claim 1 wherein the guided-wave laser output emission is limited to a wavelength of 1.45 to 1.54 microns.

14. The method of claim 1 wherein the guided-wave laser output emission is limited to a wavelength of 1.528 to 1.536 microns.

15. The method of claim 1 wherein the guided-wave laser output emission is limited to a wavelength of 1.533 to 1.534 microns.

16. The method of claim 1, wherein step (c) further comprises the step of Q-switching the Er-doped solid-state crystal laser.

17. The method of claim 16, wherein step (c) further comprises the step of utilizing a long energy storage lifetime within the Er-doped solid-state crystal laser to enable the production of Q-switched output having high pulse energies.

18. The method of claim 16, wherein step (c) further comprises the step of limiting the output pulsewidth to between 0.1 microseconds and 1 microsecond.

19. The method of claim 1, wherein step (c) further comprises the step of pumping the Er-doped solid-state crystal laser to produce laser radiation at a predetermined wavelength of 1.55 to 1.7 microns.

20. The method of claim 1, wherein step (c) further comprises the step of pumping the Er-doped solid-state crystal laser to produce laser radiation at a predetermined wavelength of 1.643 to 1.648 microns.

21. The method of claim 1, wherein step (c) further comprises the step of pumping the Er-doped solid-state crystal laser to produce laser radiation at a predetermined wavelength of 1.644 microns to 1.645 microns.

22. The method of claim 1, where an Er dopant concentration of the Er-doped solid-state crystal laser is less than 5%.

23. The method of claim 1, where an Er dopant concentration of the Er-doped solid-state crystal laser is less than 2%.

24. The method of claim 1, where an Er dopant concentration of the Er-doped solid-state crystal laser is less than 1%.

25. A device for producing laser radiation comprising:
   a laser diode having an output emission at a predetermined wavelength;
   a guided-wave laser coupled to receive the output emission of the laser diode, wherein the output emission of the laser diode pumps the guided-wave laser to create a guided-wave laser output emission;
   an Er-doped solid-state crystal laser coupled to receive the guided-wave laser output emission wherein the guided-wave laser output emission upper-state pumps the solid-state laser to produce the laser radiation.

26. The device of claim 25, wherein the Er-doped solid-state crystal comprises material selected from the group yttrium aluminum garnet (YAG), yttrium scandium gallium garnet (YSGG), gadolinium scandium gallium garnet (GSGG), gadolinium scandium aluminum garnet (GSAG), gadolinium gallium garnet (GGG), lutetium aluminum garnet (LuAG), yttrium gallium garnet (YGG), yttrium aluminum oxide (YALO), yttrium vanadate (YVO$_4$) and yttrium lithium flouride (YLF).

27. The device of claim 25, wherein the Er-doped solid-state crystal comprises material selected from the group yttrium aluminum garnet (YAG), yttrium scandium gallium garnet (YSGG), and gadolinium scandium gallium garnet (GSGG).

28. The device of claim 25, wherein the Er-doped solid-state crystal comprises yttrium aluminum garnet (YAG).

29. The device of claim 25 wherein the guided-wave laser comprises an Yb,Er-doped fiber laser.

30. The device of claim 25 wherein the guided-wave laser comprises an Yb,Er-doped waveguide laser.

31. The device of claim 25 further comprising limiting the output emission of the laser diode to a wavelength of 0.9 to 1.0 microns.

32. The device of claim 25 further comprising limiting the output emission of the laser diode to a wavelength of 0.96 to 0.98 microns.

33. The device of claim 25 wherein the guided-wave laser comprises a Raman-shifted Yb-doped fiber laser.

34. The device of claim 25 wherein the guided-wave laser comprises a Raman-shifted Yb-doped waveguide laser.

35. The device of claim 25 wherein the guided-wave laser comprises a Raman-shifted Nd-doped fiber laser.

36. The device of claim 25 wherein the guided-wave laser comprises a Raman-shifted Nd-doped waveguide laser.

37. The device of claim 25 further comprising limiting the guided-wave laser output emission to a wavelength of 1.45 to 1.54 microns.

38. The device of claim 25 further comprising limiting the guided-wave laser output emission to a wavelength of 1.528 to 1.536 microns.

39. The device of claim 25 further comprising limiting the guided-wave laser output emission to a wavelength of 1.533 to 1.534 microns.

40. The device of claim 25, further comprising a Q-switch for Q-switching the Er-doped solid-state crystal laser.

41. The device of claim 40, further comprising utilizing a long energy storage lifetime within the Er-doped solid-state crystal laser to enable the production of Q-switched output having high pulse energies.

42. The device of claim 40, further comprising limiting the output pulsewidth to between 0.1 microseconds and 1 microsecond.

43. The device of claim 25, wherein the Er-doped solid-state crystal laser produces laser radiation at a predetermined wavelength of 1.55 to 1.7 microns.

44. The device of claim 25, wherein the Er-doped solid-state crystal laser produces laser radiation at a predetermined wavelength of 1.643 to 1.648 microns.

45. The device of claim 25, wherein the Er-doped solid-state crystal laser produces laser radiation at a predetermined wavelength of 1.644 microns to 1.645 microns.

46. The device of claim 25, further comprising an Er dopant concentration of the Er-doped solid-state crystal laser of less than 5%.

47. The device of claim 25, further comprising an Er dopant concentration of the Er-doped solid-state crystal laser of less than 2%.

48. The device of claim 25, further comprising an Er dopant concentration of the Er-doped solid-state crystal laser of less than 1%.

* * * * *